United States Patent
Spitzer et al.

[11] 3,757,659
[45] Sept. 11, 1973

[54] EXPOSURE INTERLOCK FOR OSCILLOSCOPE CAMERAS

[75] Inventors: Cary R. Spitzer, Williamsburg; Jerry D. Stainback, Newport News, both of Va.

[73] Assignee: The United States of America as represented by the Administrator of the National Aeronautics and Space Administration, Washington, D.C.

[22] Filed: Nov. 11, 1971

[21] Appl. No.: 197,870

[52] U.S. Cl. ............................ 95/42, 346/110
[51] Int. Cl. ..................... G03b 19/12, G01d 9/42
[58] Field of Search ................ 95/11, 42; 346/110

[56] References Cited
UNITED STATES PATENTS
2,182,097  12/1939  Schenk ........................... 95/42
2,751,275  6/1956  Mansberg ....................... 346/110

Primary Examiner—John M. Horan
Attorney—Howard J. Osborn et al.

[57] ABSTRACT

An exposure interlock for oscilloscope cameras which cuts off ambient light from the oscilloscope screen before the shutter of the camera is tripped. A flap is provided which may be selectively positioned to an open position which enables viewing of the oscilloscope screen and a closed position which cuts off the oscilloscope screen from view and simultaneously cuts off ambient light from the oscilloscope screen. A mechanical interlock is provided between the flap and shutter trip structure which causes the flap to be activated to its closed position before the camera shutter is tripped, thereby preventing overexposure of the film.

2 Claims, 2 Drawing Figures

Patented Sept. 11, 1973

INVENTORS
CARY R. SPITZER
JERRY D. STAINBACK

BY

*Wallace Jackson*

ATTORNEYS

INVENTORS
CARY R. SPITZER
JERRY D. STAINBACK

EXPOSURE INTERLOCK FOR OSCILLOSCOPE CAMERAS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates to a mechanical exposure interlock device which prevents film overexposure in oscilloscope camera equipment.

2. Description of the Prior Art

The problem of incorrectly exposing camera film is known in the art and there are devices which prevent double exposure of camera films. For example, the Faulhaber U.S. Pat. No. 2,713,293 relates to a mechanical device wherein the release key is utilized to release the locking means of the camera in order that a camera closed to the ambient atmosphere may be opened by the application of pressure to the release key, thereby enabling the camera film to be exposed when taking a picture. It is also known in the art that means can be employed to provide accurate timing of one movement with respect to another particularly with relation to operation of the camera shutter. For example, Fahlenberg U.S. Pat. No. 2,978,970 relates to a photographic shutter construction wherein the shutter is held in tension position by various magnets. The magnets are released in sequence by electronic timing means.

SUMMARY OF THE DISCLOSURE

The prior art, however, does not provide for prevention of overexposure of film in an oscilloscope camera system by automatic interpositioning of a flap between the oscilloscope screen and the ambient atmosphere before the camera shutter is tripped. It is conventional in an oscilloscope camera to provide a viewing flap enabling the observer to view the oscilloscope screen prior to photographing. Thus, it was possible for the observer to open the viewing flap for pretest oscilloscope checkout and then accidentally leave the flap open during the actual test. When this occurred, the film was overexposed by the ambient light with the result that the film trace generated during the test was washed out.

The invention prevents overexposure of the film in an oscilloscope camera by providing a mechanical exposure interlock linkage between the flap and trip structures associated with the camera shutter whereby commencement of trip activation causes the flap to be moved toward its closed position. The flap is activated to its fully closed position wherein ambient light is cut off from the oscilloscope screen an instant before the shutter opens, thereby preventing accidental overexposure of the film. The exposure interlock according to the invention prevents this situation from occurring without affecting the operation of the oscilloscope camera.

DETAILED DESCRIPTION OF THE INVENTION

Figure 1:
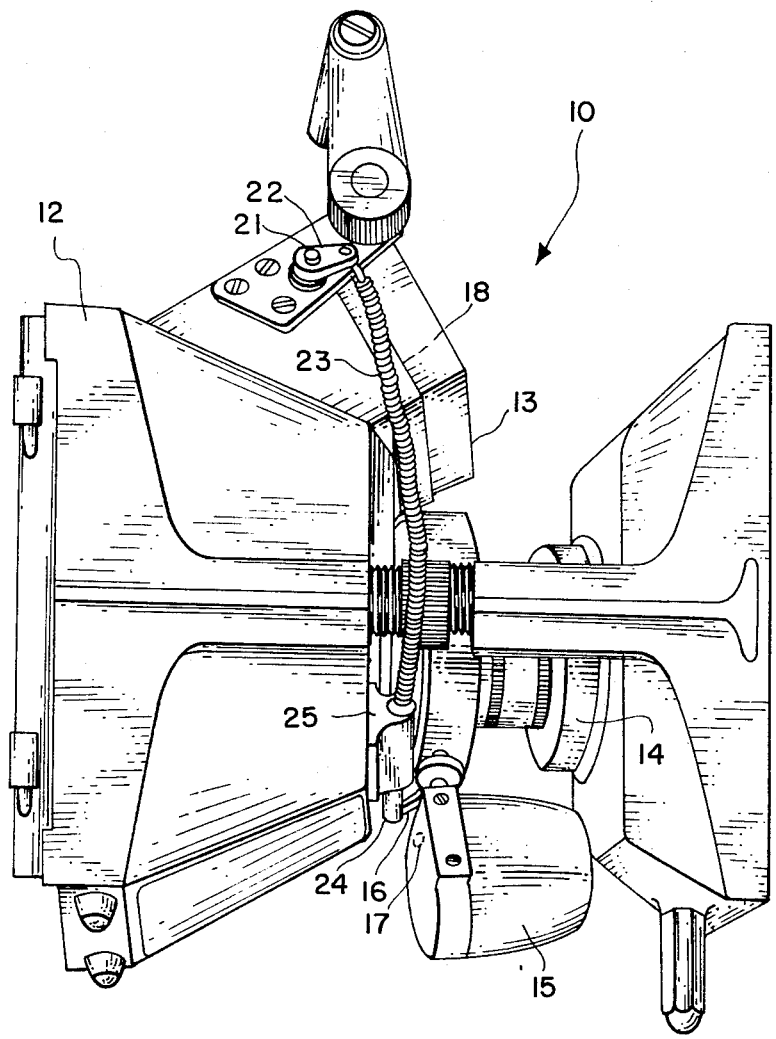
FIG. 1 is an isometric view of the invention illustrating its use in an oscilloscope camera.
Figure 2:
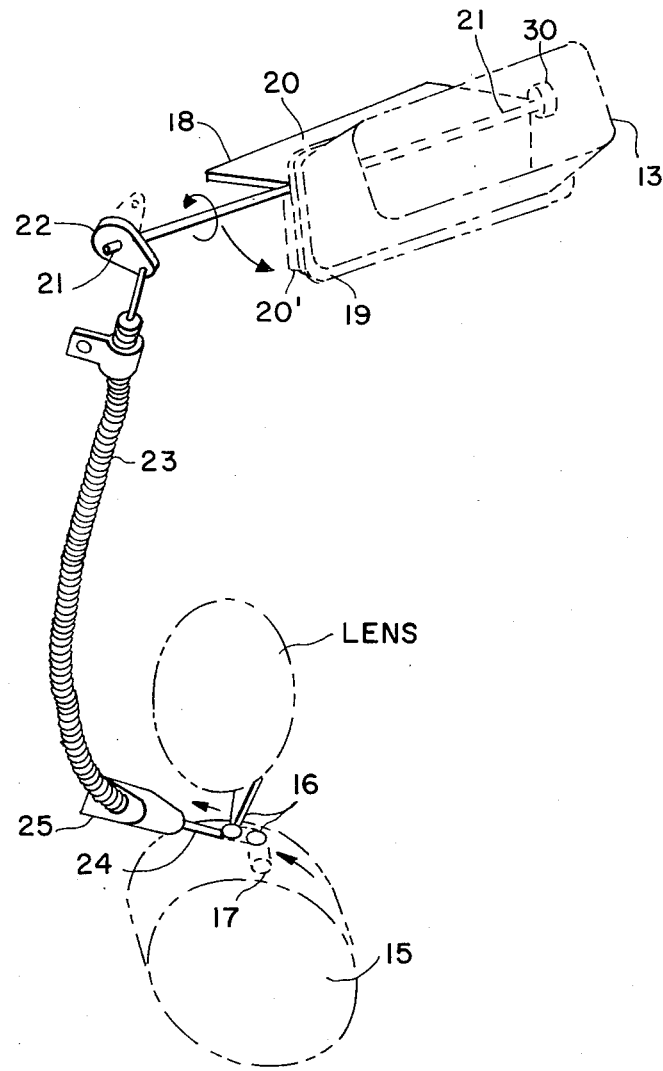
FIG. 2 is a somewhat schematic view of the specific details of the exposure interlock according to the invention.

The invention is generally illustrated in FIG. 1 with more specific details of the invention being shown in the schematic view of FIG. 2. The oscilloscope-camera structure is generally designated by reference numeral 10 in FIG. 1 with the oscilloscope being mounted within base 12 of the structure. A viewing window structure 13 extends outwardly from base 12 to enable viewing of the oscilloscope screen.

The camera structure 14 includes a magnetic trip 15 and a mechanical trip 16 for effecting tripping of the camera shutter. With reference to FIG. 2, rotation of magnetic trip 15 in the counterclockwise direction causes member 17, which comprises an integral part of magnetic trip 15, to engage shutter mechanical trip 16 and move it toward the left as shown in the Figure. Sufficient movement of the shutter mechanical trip 16 causes the shutter to be tripped. The oscilloscope and camera equipment, including the magnetic and mechanical trips for the camera shutter, are conventional elements known in the art and details thereof are consequently not discussed herein.

The particular elements comprising the invention are shown in FIG. 2. Conventional viewing flap 18 is located adjacent viewing window structure 13 and is selectively positionable for interpositioning between the screen of the oscilloscope and end 19 of the viewing window structure 13. More specifically, flap 18 selectively positionable to "open" and "closed" positions. The solid line flap structure 20 shown in FIG. 2 illustrates the "open" position whereby the oscilloscope screen may be viewed by an observer through the viewing window structure 13. The broken line flap structure 20' illustrates the "closed" position of flap 18 wherein the flap is interpositioned between the oscilloscope screen and end 19 of the viewing window structure 13, and thereby cuts off the oscilloscope screen from view and ambient light.

The flap may be activated to the "open" position by manual rotation of a knob 30 integrally attached to the support rod 21 for flap 18, or other conventional means known in the art, to enable viewing of the oscilloscope screen by the observer. When the flap is activated to the "open" position illustrated by designation numberal 20 in FIG. 2, rod 21, which is attached to flap 18 and arm 22, rotates causing arm 22 to be rotated to the position shown in solid lines in FIG. 2. Arm 22 is connected through cable 23 to plunger 24. The latter is housed in plunger housing 25. The movement of arm 22 to the solid line position illustrated in FIG. 2, which is caused by activating the flap to its open position 20, is transmitted through cable 23 to the plunger. This causes plunger 24 to be moved into abutting position against the shutter mechanical trip 16. If an attempt is made to operate either the mechanical trip 16 or the magnetic trip 15, the consequent movement will be transmitted from plunger 24 through release cable 23 to arm 22. This movement, in turn, will be transmitted through rod 21 causing the flap to move toward its closed position. The respective elements described operate such that the flap will close before the shutter is tripped.

In resume, the invention functions as follows: When flap 18 is activated to the "open" position by rotation of knob 30 to enable viewing of the oscilloscope screen, arm 22 rotates causing plunger 24 to be moved into position against the shutter mechanical trip. If an attempt is made to operate the mechanical or magnetic trip while flap 18 is open, the consequent motion is transferred through plunger 24, release cable 23 and arm-rod arrangement 22, 21 to cause flap 18 to be activated to its closed position just before the shutter is tripped open, thereby preventing accidental overexposure of the film. When flap 18 is activated to its "closed" position shown by the broken line structure 20' of FIG. 2, arm 22 is rotated to the broken line position shown which moves plunger 24, through cable 23, away from abutting position with respect to shutter mechanical trip 16 and the oscilloscope-camera may be operated without the risk of overexposure.

Although the invention has been described relative to a specific embodiment thereof, it is not so limited since, obviously, many variations and modifications thereof will be readily apparent to those skilled in the art. It is therefore to be understood that within the scope of the appended claims the invention may be practiced otherwise than as specifically described.

What is claimed as new and desired to be secured by Letters Patent of the United States is:

1. In an oscilloscope camera system having trip means actuable to trip the camera shutter to cause film exposure for photographing the image on an oscilloscope screen, and viewing means whereby an observer may view the image on the oscilloscope screen for oscilloscope checkout prior to film exposure, the viewing means having a viewing flap selectively actuable to an open position with respect to the ambience to enable the image on the oscilloscope screen to be viewed by the observer, and a closed position whereby the viewing flap is interposed between the oscilloscope screen and the ambience to preclude ambient light from reaching the oscilloscope screen through the viewing means, the improvement comprising:

exposure interlock means coupled to the viewing flap and automatically positioned with respect to the trip means in response to actuation of the viewing flap to the open position, such that movement of the trip means is transmitted to the exposure interlock means causing the thereto coupled viewing flap to be actuated to the closed position before the shutter is tripped, thereby preventing film overexposure, said exposure interlock means including, a connecting rod having first and second ends respectively fixedly connected between the viewing flap and a rotatable arm, a cable having one end connected to the rotatable arm and the other end connected to a plunger mechanism, movement of the viewing flap to the open position being transmitted by the connecting rod to the rotatable arm to cause the rotatable arm to move the plunger mechanism into abutting relationship with the trip means, whereby movement of the trip means results in corresponding movement of the plunger mechanism which is transmitted through the cable to the rotatable arm, causing the rotatable arm to move the viewing flap through the connecting rod.

2. The improvement in an oscilloscope camera system as recited in claim 1 wherein the viewing flap assumes the open position when the rotatable arm is in a first position and the closed position when the rotatable arm is in a second position, movement of the trip means when the plunger mechanism is in an abutting relationship therewith causing the rotatable arm to assume the second position before the shutter is tripped to prevent film overexposure.

* * * * *